Nov. 2, 1971   R. JUNG   3,616,565
DEVICE FOR ATTACHING FISHING REELS TO FISHING TACKLES
Filed Nov. 5, 1969   2 Sheets-Sheet 1
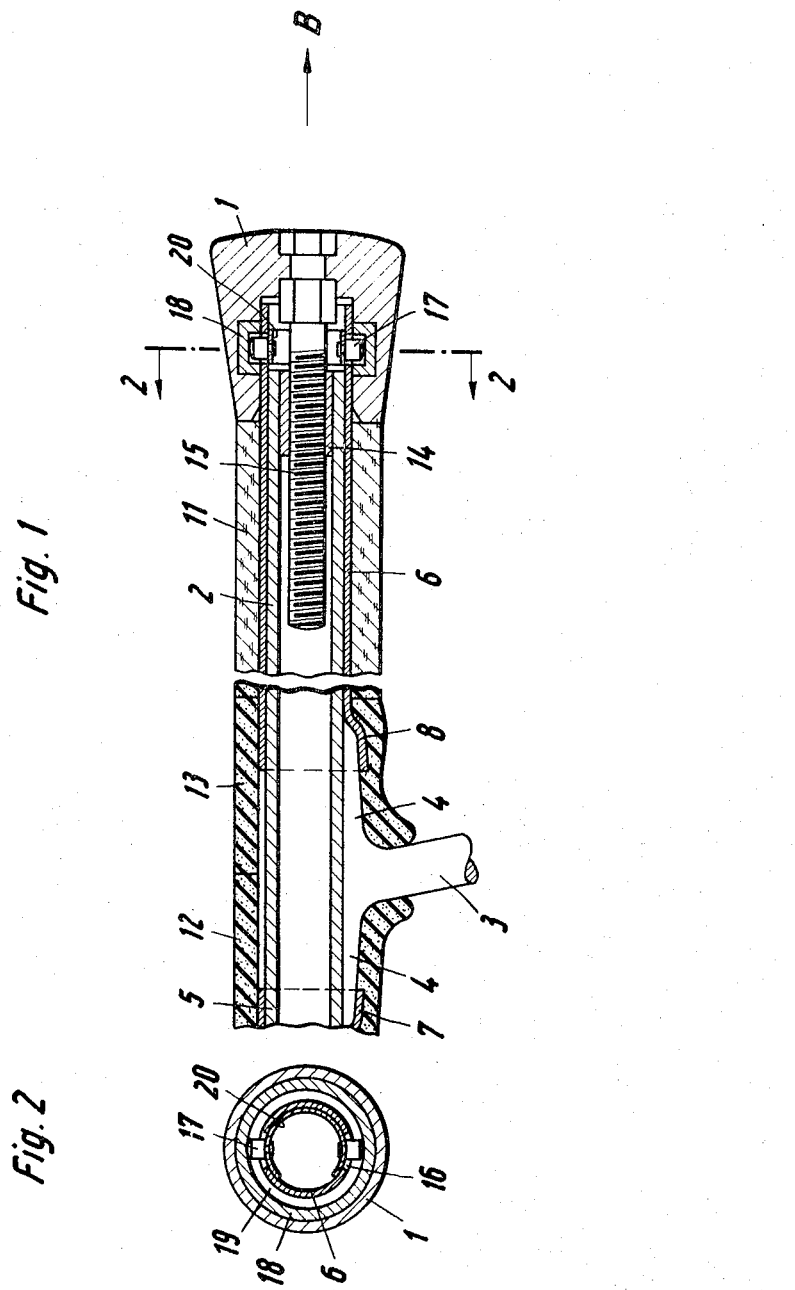
Inventor:
RUDOLF JUNG
BY
Richards y Geier
ATTORNEYS Nov. 2, 1971   R. JUNG   3,616,565
DEVICE FOR ATTACHING FISHING REELS TO FISHING TACKLES
Filed Nov. 5, 1969   2 Sheets-Sheet 2
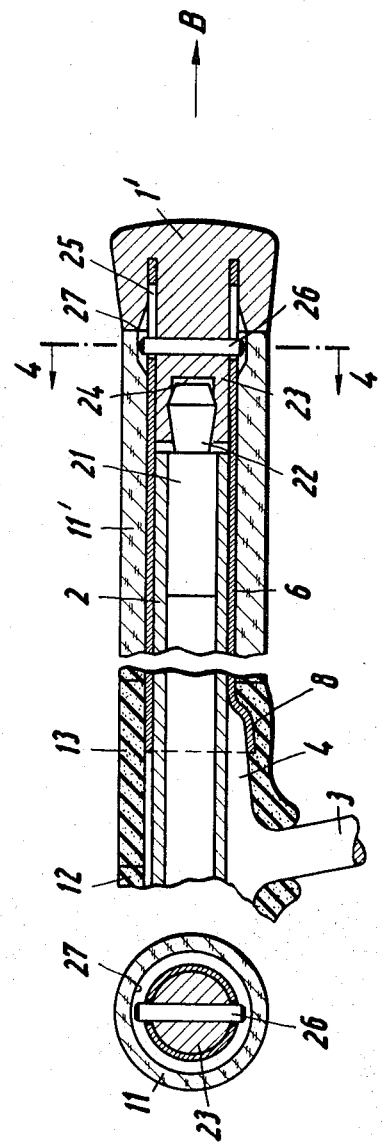
Inventor:
RUDOLF JUNG
By
Richards & Geier
ATTORNEYS United States Patent Office 3,616,565
Patented Nov. 2, 1971

3,616,565
DEVICE FOR ATTACHING FISHING REELS TO FISHING TACKLES
Rudolf Jung, Berlin, Germany, assignor to Deutsche Angelgerate Manufaktur (DAM) Hellmuth Kuntze Gesellschaft mit beschrankter Haftung & Co., Kommanditgesellschaft, Berlin, Germany
Filed Nov. 5, 1969, Ser. No. 874,247
Claims priority, application Germany, Dec. 10, 1968, G 68 11 311.1–7401
Int. Cl. A01k 87/06
U.S. Cl. 43—22          4 Claims

ABSTRACT OF THE DISCLOSURE

A fishing tackle has a cylindrical handle carrying the fishing rod. Two cylindrical sleeves are mounted upon the handle and at least one of them is movable thereon. The fishing reel has a T-shaped support with opposed flanges which can lie against the handle. The two sleeves have opposed shoe-like extensions with inclined surfaces extending over the edges of the flanges. Each sleeve is enclosed by covers consisting of poorly heat conducting material. A cap mounted upon the end of the handle is used to press the sleeves and their covers against the reel support. The present invention is particularly characterized by a removable connection between the cap and the end of the handle and by a driver element connecting the cap with the adjacent sleeve.

---

This invention relates to a device for fixing a fishing reel having a T-shaped support to a fishing tackle.

Existing constructions of this type include a tackle having a tubular handle and two sleeves mounted upon the handle. The sleeves are located on opposite sides of the T-shaped reel support which has opposed flanges lying against the handle. Each of the sleeves has a shoe-like extension with an inclined surface overlapping an edge of a flange. Each sleeve is enclosed by a cover which is a poor conductor of heat. The sleeves and their covers are clamped against the T-shaped reel support by a removable cap.

An object of the present invention is to provide a device which will effectively clamp the reel support but which will permit an easy exchange of the reels.

Another object is the provision of a device of this type which is so constructed that it is difficult to lose its various parts, particularly the cap.

Other objects of the present invention will become apparent in the course of the following specification.

In the accomplishment of the objectives of the present invention it was found desirable to provide a removable connection between the cap and the cylindrical handle and to connect the cap with one of the sleeves through a driver element.

According to one of the embodiments of the present invention the removable connection between the cap and the handle is provided by a threaded bush firmly fixed inside the cylindrical handle close to the free end thereof and a threaded pin which is firmly connected with the cap and which is screwed into the bush. The sleeve has radial openings close to the cap but outside of the handle through which coupling pins extend. These pins are located in an annular groove provided in the cap and open to the threaded bush. According to a particularly advantageous construction the coupling pins are mounted upon an annular resilient clamp which is pressed against an inner wall of the sleeve, while the annular groove in the cap is provided with a U-shaped ring inserted into the cap and engaging an outer surface of the sleeve.

According to another embodiment of the present invention the disengageable connection between the cap and the handle is provided by a pin inserted into the end of the handle and provided with a head having the shape of a double frusto cone and extending beyond the handle. The cap has a lug provided with an axial recess. The lug engages an end of the sleeve and consists of an elastically deformable material, at least as far as this part of the cap is concerned. The change in shape takes place when the head is introduced into the lug. According to an advantageous construction, a transverse pin extends through slits closed on both sides and provided upon that end of the sleeve which is located inside the cap. The pin has ends extending into an annular recess provided in the cap and the adjacent covers.

The invention will appear more clearly from the following detailed description when taken in connection with the accompanying drawings, showing, by way of example only, preferred embodiments of the inventive idea.

In the drawings:
FIG. 1 is a longitudinal section through parts of a handle of a fishing tackle provided with the device of the present invention;
FIG. 2 is a transverse section along the line II—II of FIG. 1;
FIG. 3 is a similar longitudinal section through a different embodiment of the present invention;
FIG. 4 is a transverse section along the line IV—IV of FIG. 3.

Both illustrated embodiments show the connection of a fishing reel with the tubular handle 2 of a fishing tackle.

The handle 2 carries a fishing rod (not shown) fixed to the handle and extending out of one of its ends. The fishing reel which not shown in detail has a support 3 provided with two opposed flanges 4 lying against the surface of the handle. As shown in FIG. 1, two sleeves 5 and 6 are mounted upon the handle 2 on opposite sides of the support 3. The sleeves 5 and 6 have opposed shoe-like extensions 7 and 8 which extend over the ends of the flanges 4. The sleeve 5 is attached to the handle 2 in any suitable manner (not shown), while the sleeve 6 is slidable upon the handle 2. A cap 1 removably mounted upon the free end of the handle 2 is used to clamp the reel support 3 between the two sleeves 5 and 6.

Each of the sleeves 5 and 6 is enclosed by a separate cover consisting of two parts, the covers being made of substances which are poor conductors of heat. The sleeve 6 is enclosed by a cover 11 made of cork or a plastic material and a continuing cover 13 made of rubber. Similarly, the sleeve 5 is enclosed by a cover of cork or plastic (not shown) and a cover 12 made of rubber. Pressure exerted by the cap 1 is also transmitted to the covers so that the covers 12 and 13 are pressed against each other and will tightly enclose the reel supoprt 3, possible differences in length being compensated. The covers 12 and 13 can be also provided with suitable recesses.

In accordance with the embodiment of the present invention shown in FIGS. 1 and 2, a threaded bush 14 is inserted into the end of the tubular handle 2. A threaded bolt 15 which is firmly connected with the cap 1; is screwed into the bush 14. The sleeve 6 has radial openings 16 located opposite the cap 1 but outside of the handle 2. Coupling pins 17 which extend through the openings 16, engage a ring 18 embedded in the cap 1. The ring 18 is located in an annular groove 19 open toward the bolt; it engages an outer surface of the sleeve 6 and is U-shaped in cross section.

The coupling pins 17 are mounted on a ring-shaped spring clamp 20 which presses against the inner wall of the sleeve 6.

FIGS. 1 and 2 show the handle with the fishing reel firmly fixed thereon. To open this connection, the cap 1 is unscrewed from the handle 2 in the direction of the arrow B (FIG. 1). The sleeve 6 moves along with the cap so that its extension 8 frees the flange 4. Then the covers 12 and 13 are moved away from each other and then the reel support 3 is freed, so that the reel can be removed.

A reverse procedure is used to attach a fishing reel to the handle. The reel support is placed upon the handle with the flanges 4 engaging the handle. Then one of the flanges 4 is shifted under the extension 7 of the sleeve 5. Then the cap 1 is screwed in until the extension 8 of the sleeve 6 moves over the other flange 4 and firmly engages it. The cap 1 is turned until both flanges are firmly clamped. The covers of the sleeves will also move into interengaging positions.

The embodiment of the present invention illustrated in FIGS. 3 and 4 is essentially similar to that of the described construction of FIGS. 1 and 2, the basic difference being that of the connection between the cap 1' and the handle 2. Similar parts are indicated by the same numerals.

In the construction of FIGS. 3 and 4 a pin 21 which is firmly fixed within the tubular handle 2, is provided with a head 22 extending beyond the handle and having the shape of two opposed frusto-cones. The sleeve 6 is fixed to the cap 1' by a lug or sleeve 23 which constitutes a part of the cap and which extends into the sleeve 6. The lug 23 has an axial recess 24. At least the lug 23 of the cap consists of an elastic shapable material.

The sleeve 6 has two opposed slits 25 which are closed at both ends. A pin 26 extends through these slits and has ends extending into a recess 27 provided in the cap and in the adjacent end of the cover 11'.

To remove the reel which is fixed to the handle, the cap is moved out in the direction of the arrow B (FIG. 3). Then the head 22 is freed and the sleeve 6 is pulled by the pin 26. Thus one flange 4 of the reel support is freed and after the covers 11', 13 and 12 have been pulled apart, both flanges of the reel support can be moved out of engagement with the sleeves, so that the reel can be removed.

The attachment of the reel to the handle is carried out in the same manner as that of the embodiment shown in FIGS. 1 and 2. The reel support is placed upon the handle with one flange 4 being moved under a sleeve and the covers 12, 13 are caused to engage the support 3. Then the cap is pressed by hand in the direction opposed to that of the arrow B, the head 22 adjusting the shape of the elastic sleeve 23, whereupon the sleeve 23 will engage with great friction the head 22 and the inner surface of the sleeve 6. The sleeve 6 which has firmly engaged the flange 4 with its extension 8 will be held firmly along with its cover, so that these parts cannot be pulled out unintentionally.

The connections between the cap and the sleeve described in both embodiments avoid the danger that the cap may be lost.

I claim:

1. A device for fixing a fishing reel having a support with two opposed flanges upon the tubular handle of a fishing tackle, said device comprising two sleeves mounted upon said handle, at least one of said sleeves being movable, said sleeves being located on opposite sides of said support and having opposed extensions with inclined surfaces, each of said extensions being adapted to overlap a portion of a separate flange, covers enclosing said sleeves, said covers having resilient portions adjacent said support, a cap, means removably connecting said cap with one end of said handle and comprising a threaded bush fixed within said handle adjacent said one end thereof and a threaded bolt having an end firmly connected with said cap, said bolt meshing with said bush, and means connecting said cap with said movable sleeve and comprising coupling pins extending through openings formed in said movable sleeve, said pins having ends located in an annular groove formed in said cap.

2. A device in accordance with claim 1, wherein the second-mentioned means further comprise a ring-shaped spring clamp supporting said pins and engaging an inner surface of said movable sleeve, and a ring which is U-shaped in cross-section and is located in said annular groove, said ring engaging an outer surface of said movable sleeve.

3. A device in accordance with claim 1, wherein the first-mentioned means comprise a pin fixed within said handle adjacent said one end thereof and having a head of double frusto-conical shape, and a lug carried by said cap and having an elastic portion enclosing said head.

4. A device in accordance with claim 3, wherein the second-mentioned means comprise a pin extending through slits closed at both ends and formed in said movable sleeve, said pin having ends extending into a recess formed in said cap and in an adjacent portion of the cover enclosing said movable sleeve.

References Cited

UNITED STATES PATENTS

| | | | |
|---|---|---|---|
| 3,295,244 | 1/1967 | Kuntze | 43—22 |
| 1,350,637 | 8/1920 | Beaty | 43—22 |
| 2,114,107 | 4/1938 | Holding | 43—22 |
| 2,182,409 | 12/1939 | Richards | 43—22 |
| 3,098,313 | 7/1963 | Portz | 43—22 |

WARNER H. CAMP, Primary Examiner